US012609235B2

(12) United States Patent
Hamachi et al.

(10) Patent No.: US 12,609,235 B2
(45) Date of Patent: Apr. 21, 2026

(54) MULTILAYER INDUCTOR

(71) Applicant: TDK CORPORATION, Tokyo (JP)

(72) Inventors: Noriaki Hamachi, Tokyo (JP); Toshinori Matsuura, Tokyo (JP); Junichiro Urabe, Tokyo (JP); Kazuya Tobita, Tokyo (JP); Yuto Shiga, Tokyo (JP); Youichi Kazuta, Tokyo (JP); Yuichi Takubo, Tokyo (JP); Shunya Suzuki, Tokyo (JP); Xuran Guo, Tokyo (JP); So Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 655 days.

(21) Appl. No.: 18/187,785

(22) Filed: Mar. 22, 2023

(65) Prior Publication Data

US 2023/0326661 A1 Oct. 12, 2023

(30) Foreign Application Priority Data

Mar. 25, 2022 (JP) ................................ 2022-050281

(51) Int. Cl.
*H01F 27/28* (2006.01)

(52) U.S. Cl.
CPC ................................ *H01F 27/2804* (2013.01)

(58) Field of Classification Search
CPC ................................................... H01F 27/2804
See application file for complete search history.

(56) References Cited

U.S. PATENT DOCUMENTS 4,538,132 A * 8/1985 Hiyama .............. H01F 27/2804 336/232
2018/0316077 A1* 11/2018 Yamane .................... H01P 5/12
2019/0228894 A1* 7/2019 Hara ...................... H10N 50/85
2021/0090786 A1* 3/2021 Arai ...................... H01F 27/255
2021/0104353 A1* 4/2021 Yamauchi ............... H01F 17/04
2022/0037083 A1* 2/2022 Arai .................... H01F 17/0013

FOREIGN PATENT DOCUMENTS

JP H10335146 A * 12/1998
JP 2006-086216 A 3/2006

* cited by examiner

*Primary Examiner* — Malcolm Barnes
(74) *Attorney, Agent, or Firm* — Oliff PLC

(57) ABSTRACT

The mainline pattern and the pair of bypass patterns in the multilayer inductor can be regarded as three inductors connected in parallel in the element body. That is, in the multilayer inductor, paralleling of the inductance is realized in the element body by the mainline pattern and the pair of bypass patterns. Therefore, the inductance value of the multilayer inductor as a whole can be reduced.

9 Claims, 6 Drawing Sheets

MULTILAYER INDUCTOR

CROSS-REFERENCE TO RELATED APPLICATIONS

This application is based upon and claims the benefit of priority from Japanese Patent Application No. 2022-50281, filed on 25 Mar. 2022, the entire contents of which are incorporated herein by reference.

TECHNICAL FIELD

The present disclosure relates to a multilayer inductor.

BACKGROUND

Well known in the art is a multilayer inductor in which a conductor pattern is provided in an insulating element body having a multilayer structure where a plurality of insulating layers are laminated.

Patent Document

Patent Document 1: Japanese Patent Unexamined Publication No. 2006-86216

SUMMARY

The inventors have studied the inductance value of the multilayer inductor, and as a result, have newly found a technique capable of reducing the inductance value.

According to the present disclosure, the inductance value can be reduced.

A multilayer inductor according to an embodiment of the present disclosure includes an element body having a multilayer structure in which a plurality of insulating layers are laminated, and having a mounting surface and a pair of side surfaces facing each other in a first direction parallel to the mounting surface, a mainline pattern made of conductive material, extending linearly in the first direction between the pair of side surfaces of the element body, both end portions of the mainline pattern are exposed from the pair of side surfaces, a bypass pattern made of conductive material, branched from and merged with the mainline pattern at positions away from the pair of side surfaces of the element body, and a pair of terminal electrodes respectively provided on the pair of side surfaces of the element body and electrically connected to the mainline pattern.

In the above-described multilayer inductor, the paralleling of the inductance is realized in the element body by means of the mainline pattern and the bypass pattern. The inductance value of the multilayer inductor is reduced as a whole (that is, the combined inductance value) as compared with the case where only the mainline pattern is provided. In the multilayer inductor according to another aspect, the plurality of insulating layers are laminated in a second direction orthogonal to the first direction and parallel to the mounting surface.

In the multilayer inductor according to another aspect, a height position of the mainline pattern is higher than an intermediate height position of the element body in height position relative to the mounting surface.

In the multilayer inductor according to another aspect, the bypass pattern is located on the mounting surface side of the mainline pattern.

In the multilayer inductor according to another aspect, the bypass pattern includes a smoothly continuous curved portion and a straight portion, and has no corner portion.

In the multilayer inductor according to another aspect, a width of the mainline pattern on both outsides of the positions where the bypass pattern is branched from and merged with the mainline pattern is wider than a width of the mainline pattern between the positions where the bypass pattern is branched from and merged with the mainline pattern.

In the multilayer inductor according to another aspect, a width of the mainline pattern on both outsides of the positions where the bypass pattern is branched from and merged with the mainline pattern is wider than a width of the bypass pattern.

The multilayer inductor according to another embodiment includes a plurality of the bypass patterns.

In the multilayer inductor according to another aspect, the plurality of bypass patterns are symmetric with respect to the mainline pattern.

DETAILED DESCRIPTION

Figure 1:
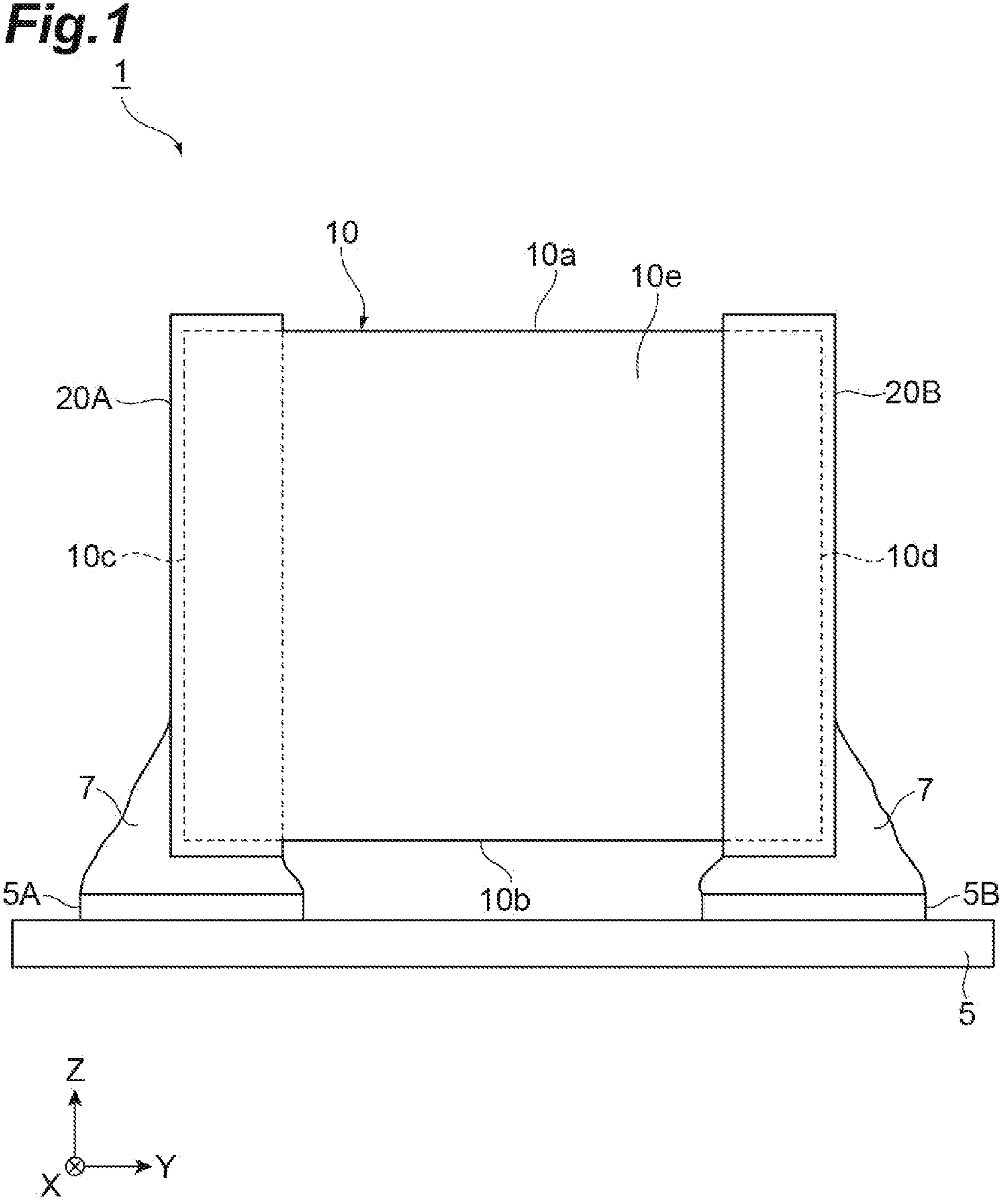
FIG. 1 is a schematic side view of a multilayer inductor according to one embodiment.

Hereinafter, embodiments of the present disclosure will be described in detail with reference to the accompanying drawings. In the description, the same reference numerals are used for the same elements or elements having the same functions, and redundant description will be omitted.

Figure 2:
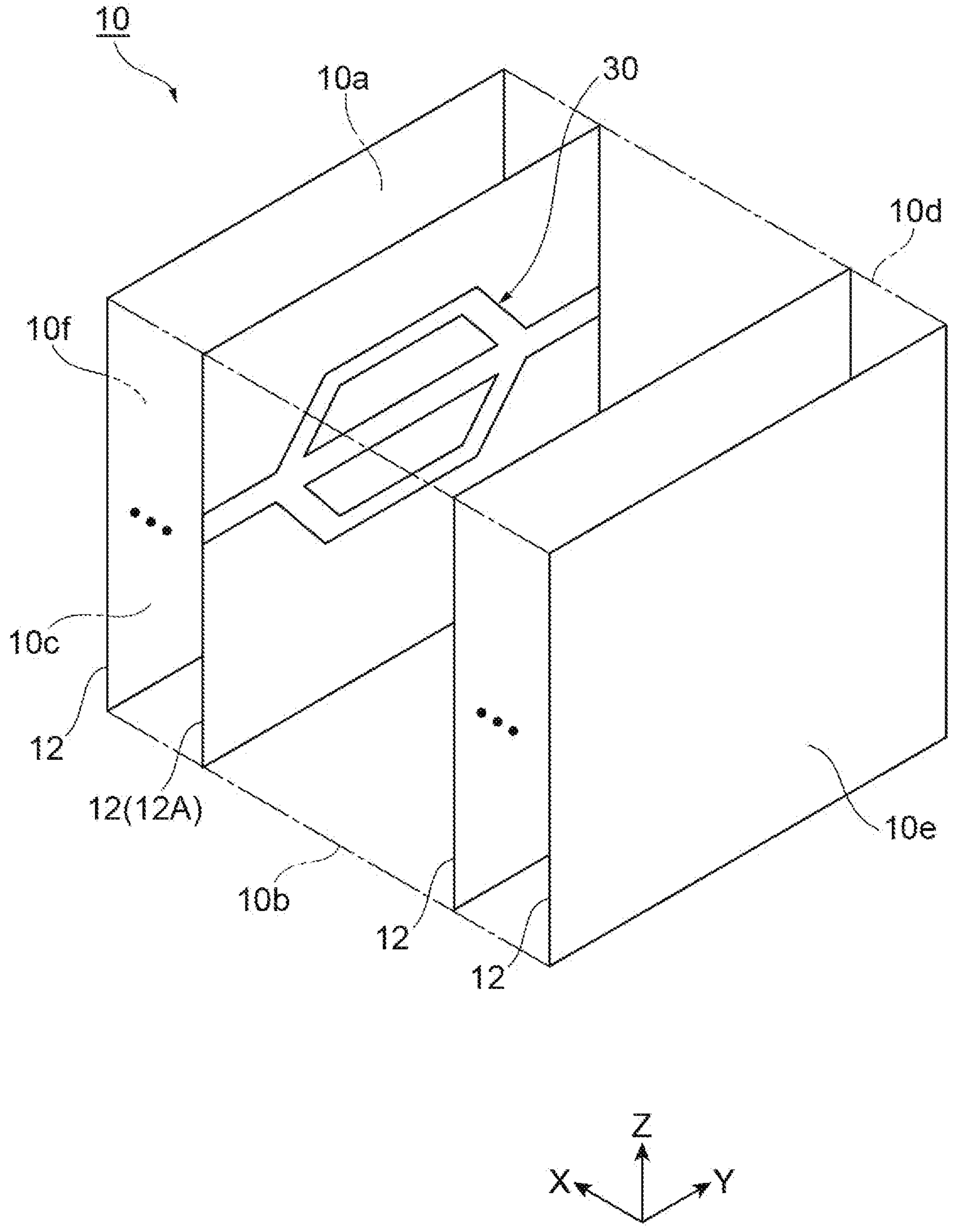
FIG. 2 is a perspective exploded view of the element body shown in FIG. 1.
Figure 3:
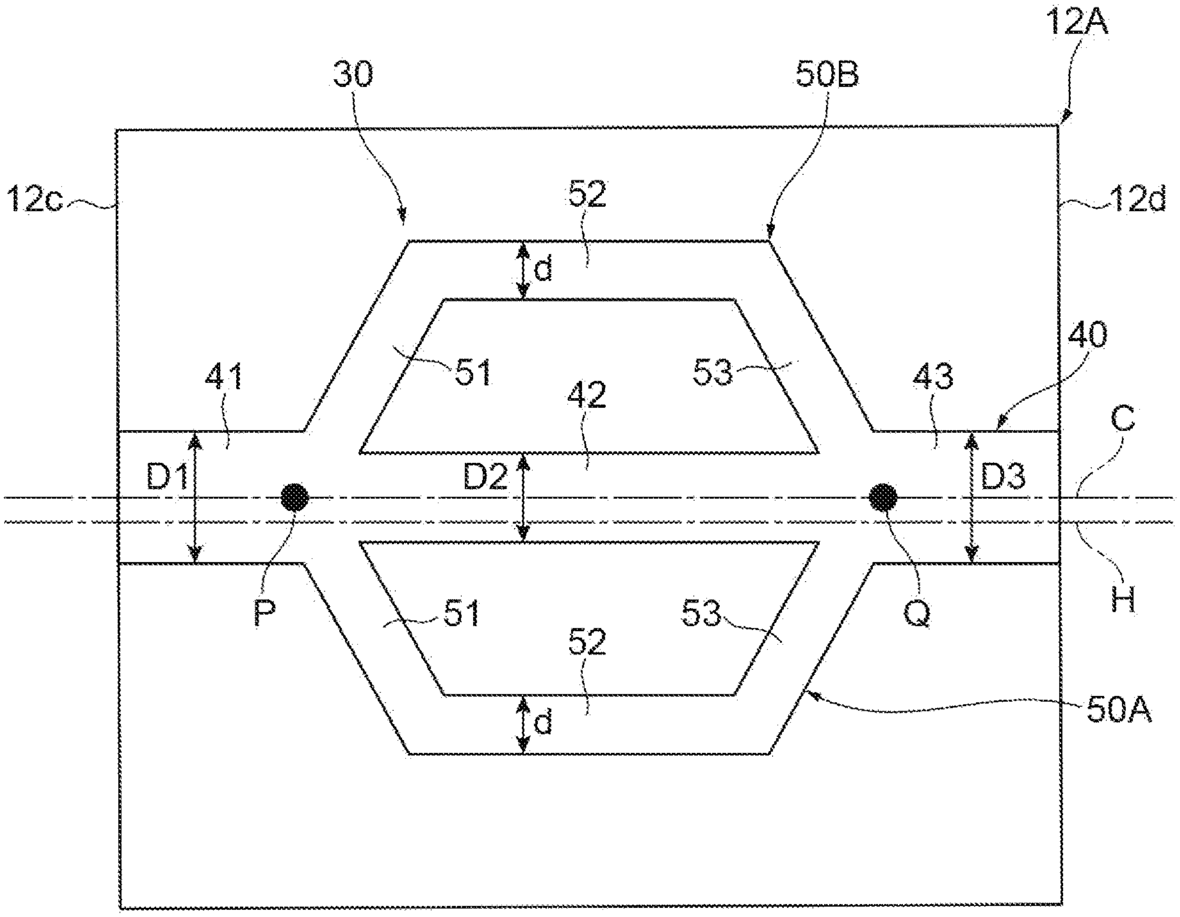
FIG. 3 is a view showing an inner conductor provided in an insulating layer of the element body.

A configuration of a multilayer inductor 1 according to one embodiment will be described with reference to FIGS. 1 to 3. The multilayer inductor 1 includes an element body 10, a pair of terminal electrodes 20A and 20B provided on the element body 10, and an inner conductor 30 provided inside the element body 10.

The element body 10 has a substantially rectangular parallelepiped outer shape. The element body 10 has an upper surface 10*a*, a lower surface 10*b*, a pair of side surfaces 10*c* and 10*d* facing each other, and a pair of side surfaces 10*e* and 10*f* facing each other. In the present embodiment, the lower surface 10*b* of the element body 10 is a mounting surface facing the mounting substrate 5 on which the multilayer inductor 1 is mounted. Hereinafter, for convenience of description, the facing direction of the upper surface 10*a* and the lower surface 10*b* is also referred to as a Z direction, the facing direction of the side surfaces 10*c* and 10*d* is also referred to as a Y direction (first direction), and the facing direction of the side surfaces 10*e* and 10*f* is also referred to as an X direction (second direction).

The element body 10 has a multilayer structure in which a plurality of insulating layers 12 are laminated in the X direction. Each of the insulating layers 12 extends so as to be orthogonal to the lower surface 10*b* of the element body

10 and parallel to the facing direction of the side surfaces 10*c* and the 10*d*. The number of insulating layers 12 is seven as an example, and can be increased or decreased as appropriate. In actuality, the insulating layers 12 in the element body 10 may be integrated to such an extent that the boundary is not visually recognized. The insulating layer 12 is made of insulating material and may be made of non-magnetic material. The non-magnetic material may be, for example, a material including at least one of glass-ceramic material and dielectric material.

The pair of terminal electrodes 20A and 20B are provided on the pair of side surfaces 10*c* and 10*d*, respectively. In the present embodiment, the pair of terminal electrodes 20A and 20B cover the entire surfaces of the pair of side surfaces 10*c* and 10*d*, respectively, and wrap around the upper surface 10*a*, the lower surface 10*b*, and the side surfaces 10*e* and 10*f* to cover a portion of each of the surfaces 10*a*, 10*b*, 10*e*, and 10*f*. The terminal electrodes 20A and 20B can be formed by a dipping method including a step of dipping the side surfaces 10*c* and 10*d* of the element body 10 in conductive paste. Each of the terminal electrodes 20A and 20B may have a single-layer structure or a multilayer structure.

The inner conductor 30 is provided on one insulating layer 12A of the plurality of insulating layers 12 constituting the element body 10. The inner conductor 30 is made of conductive material, and may be made of metal material such as Ag or alloy material. The inner conductor 30 is patterned by printing conductive paste for example. The inner conductor 30 includes a mainline pattern 40 and a pair of bypass patterns 50A and 50B as shown in FIG. 3.

The mainline pattern 40 extends linearly along one direction. Specifically, it extends along the Y direction between the sides 12*c* and 12*d* of the insulating layer 12A corresponding to the side surfaces 10*c* and 10*d* of the element body 10. The mainline pattern 40 has a line-symmetric shape with respect to the center line C extending in the Y direction. The mainline pattern 40 is designed such that the height position of the center line C thereof (that is, the height position based on the lower surface 10*b* of the element body 10) is higher than the middle height position H of the element body 10, and is located in the upper half of the element body 10. The mainline pattern 40 includes a first portion 41, a second portion 42, and a third portion 43 which are arranged in order from the side closer to the side 12*c* of the insulating layer 12A corresponding to the side 10*c* of the element body 10. The first portion 41 has a uniform width D1 and extends along the Y direction from a side 12*c* of the insulating layer 12A corresponding to the side 10*c* of the element body 10. The second portion 42 has a uniform width D2 narrower than the width D1 and continuously extends from the first portion 41 along the Y direction. The third portion 43 has a uniform width D3 wider than the width D2 and continuously extends from the second portion 42 along the Y direction, and reaches the side 12*d* of the insulating layer 12A corresponding to the side 10*d* of the element body 10. In the present embodiment, the width D3 of the third portion 43 are equal to the width D1 of the first portion 41 of the mainline pattern 40.

The first portion 41 and the third portion 43 corresponding to both end portions of the mainline pattern 40 are exposed from the pair of side surfaces 10*c* and 10*d* of the element body 10 and are electrically connected to the pair of terminal electrodes 20A and 20B provided on the pair of side surfaces 10*c* and 10*d*, respectively.

A point P at which the mainline pattern 40 is switched from the first portion 41 to the second portion 42 is apart from the side 12*c* of the insulating layer 12A corresponding to the side 10*c* of the element body 10. Further, a point Q at which the mainline pattern 40 is switched from the second portion 42 to the third portion 43 is apart from the side 12*d* of the insulating layer 12A corresponding to the side 10*d* of the element body 10.

Each of the pair of bypass patterns 50A and 50B has a substantially U-shape. Each of the bypass patterns 50A and 50B is branched from the mainline pattern 40 at the point P of the mainline pattern 40, and is merged with the mainline pattern 40 at the point Q of the mainline pattern 40. In the following description, the point P is referred to as a branch point, and the point Q is referred to as a merging point. Each of the bypass patterns 50A and 50B includes a first portion 51, a second portion 52, and a third portion 53 that are arranged in order from the closest to the branch point P.

The second portion 52 extends parallel to the mainline pattern 40 between P and Q (i.e., extends in the Y direction). The second portion 52 of the bypass pattern 50A is located closer to the lower surface 10*b* side (lower side in FIG. 3) of the element body 10 than the mainline pattern 40, and is apart from the second portion 42 of the mainline pattern 40 by a predetermined distance. The second portion 52 of the bypass pattern 50B is located on the upper surface 10*a* side (upper side in FIG. 3) of the element body 10 with respect to the mainline pattern 40, and is apart from the second portion 42 of the mainline pattern 40 by a predetermined distance. The gap between the second portion 52 of the bypass pattern 50A and the second portion 42 of the mainline pattern 40 and the gap between the second portion 52 of the bypass pattern 50B and the second portion 42 of the mainline pattern 40 may be the same or different.

The first portion 51 linearly extends from the branch point P of the mainline pattern 40 to an end portion of the second portion 52 on the side 12*c* side. The third portion 53 linearly extends from an end portion of the second portion 52 on the side 12*d* side to the merging point Q of the mainline pattern 40.

In the present embodiment, each of the bypass patterns 50A and 50B has a uniform width d over the first portion 51, the second portion 52, and the third portion 53. Width d of the bypass patterns 50A and 50B may be designed to be narrower than widths D1, D2, and D3 of the mainline pattern 40. The pair of bypass patterns 50A and 50B have symmetry with respect to the mainline pattern 40. More specifically, the pair of bypass patterns 50A and 50B have a line-symmetric relationship with respect to the center line C of the mainline pattern 40.

As shown in FIG. 1, the multilayer inductor 1 is mounted on the mounting substrate 5 in a posture in which the lower surface 10*b* of the element body 10 faces the mounting substrate 5. A pair of land electrodes 5A and 5B are provided on the mounting substrate 5, and the pair of land electrodes 5A and 5B and the pair of terminal electrodes 20A and 20B are connected by, for example, solder 7. A voltage can be applied between the pair of terminal electrodes 20A and 20B of the multilayer inductor 1 via the land electrodes 5A and 5B of the mounting substrate 5.

In the multilayer inductor 1, for example, when a current flows from one terminal electrode 20A to the other terminal electrode 20B, the current flowing through the first portion 41 of the mainline pattern 40 is branched at the branch point P into three currents, that is, a current flowing through the second portion 42 and currents flowing through the pair of bypass patterns 50A and 50B. The current flowing into the second portion 42 of the mainline pattern 40 flows into the third portion 43 at the merging point Q, and the currents flowing into the pair of bypass patterns 50A and 50B also merge with the mainline pattern 40 at the merging point Q. In this case, the mainline pattern 40 and the pair of bypass patterns 50A and 50B can be regarded as three inductors connected in parallel in the element body 10. That is, in the multilayer inductor 1, paralleling of the inductance in the element body 10 is realized by the mainline pattern 40 and the pair of bypass patterns 50A and 50B. Therefore, the inductance value of the multilayer inductor 1 is reduced as a whole (i.e., the combined inductance value), and the inductance value is lower than that in the case where only the mainline pattern 40 is provided without the bypass patterns 50A and 50B.

Figure 4:
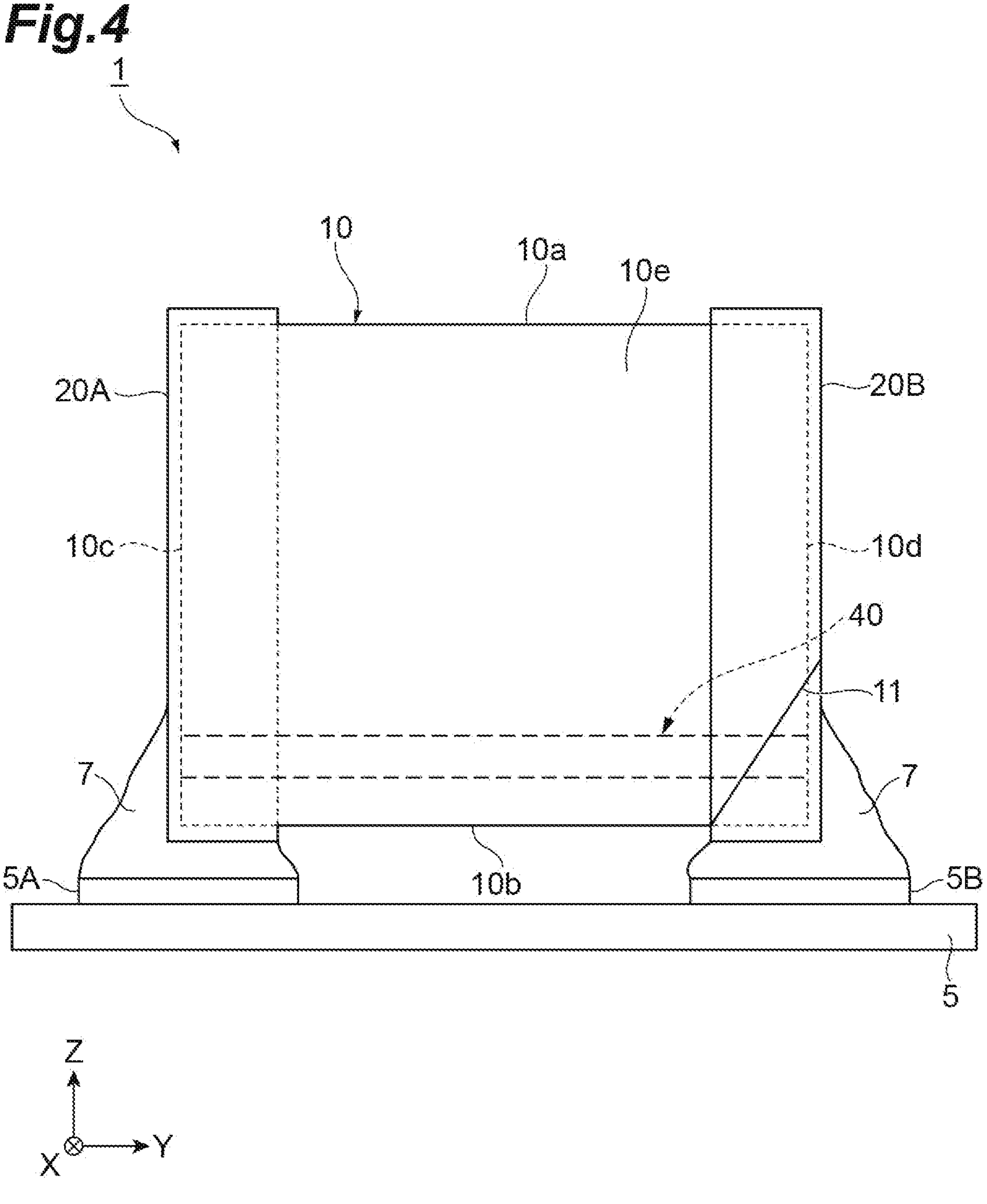
FIG. 4 is a schematic side view showing cracks occurring in the element body.

When flexural deformation of the mounting substrate 5 occurs, stress caused by the flexural deformation may occur in the multilayer inductor 1. The stress is likely to be concentrated at the tip position of the terminal electrode 20B on the lower surface 10*b*, and it is conceivable that a crack 11 starting from this position occurs in the element body 10. As shown in FIG. 4, the crack 11 may extend from the lower surface 10*b* of the element body 10 toward the side surface 10*d* and reach the side surface 10*d*. As shown in FIG. 4, when the mainline pattern 40 is positioned in the vicinity of the lower surface 10*b* of the element body 10, the inductance value can be expected to be reduced, but the mainline pattern 40 may be damaged or disconnected due to the crack 11, and the element characteristics may be significantly deteriorated.

In the multilayer inductor 1, the height position of the mainline pattern 40 is higher than the middle height position H of the element body 10, and even when the crack 11 as shown in FIG. 4 occurs, the crack 11 hardly reaches the mainline pattern 40, so that the element characteristics can be maintained. That is, in the multilayer inductor 1, the inductance value is reduced while avoiding the influence of the crack 11. The height position of the mainline pattern 40 may be higher than the middle height position H of the element body 10, and may be in the vicinity of the middle height position H, for example.

In addition, in the multilayer inductor 1, since the pair of bypass patterns 50A and 50B have a line-symmetric relationship with respect to the center line C of the mainline pattern 40, a change in element characteristics is less likely to occur even when the element body 10 is vertically inverted. The pair of bypass patterns 50A and 50B may have a point-symmetrical relationship with respect to an arbitrary point on the center line C of the mainline pattern 40. The pair of bypass patterns 50A and 50B do not necessarily share the branch point P and the merging point Q. The pair of bypass patterns 50A and 50B may branch at different branch points or may merge at different merging points.

In the multilayer inductor 1, the width D1 of the first portion 41 and the width D3 of the third portion 43 of the mainline pattern 40 are designed to be larger than the width D2 of the second portion 42 (D1>D2, D3>D2), the electric resistance ($R_{dc}$) at both ends of the mainline pattern 40 is reduced. Both end portions of the mainline pattern 40 can be designed to be locally wider at portions exposed to the side surfaces 10*c* and 10*d*. In this case, the connectivity between the mainline pattern 40 and the terminal electrodes 20A and 20 is improved. In addition, since the second portion 42 of the mainline pattern 40 is designed to have the width D2 larger than the widths d of the bypass patterns 50A and 50B, when the widths d of the bypass patterns 50A and 50B are larger than the widths D2 (d>D2), the electrical length is shortened, and the electrical resistance ($R_{dc}$) is reduced.

Furthermore, in the multilayer inductor 1, when the sum of the widths of the inner conductor 30 before branching (i.e., the width D1 of the first portion 41 of the mainline pattern 40) is compared with the sum of the widths of the inner conductor 30 after branching (i.e., the sum of D2+d+d that is the width D2 of the second portion 42 of the mainline pattern 40 and the widths d of the pair of the bypass patterns 50A an 50B), the sum of the widths of the inner conductors 30 after branching is larger (i.e., D1<D2+d+d) and the electrical resistance ($R_{dc}$) is reduced to realize a high Q value.

Figure 5:
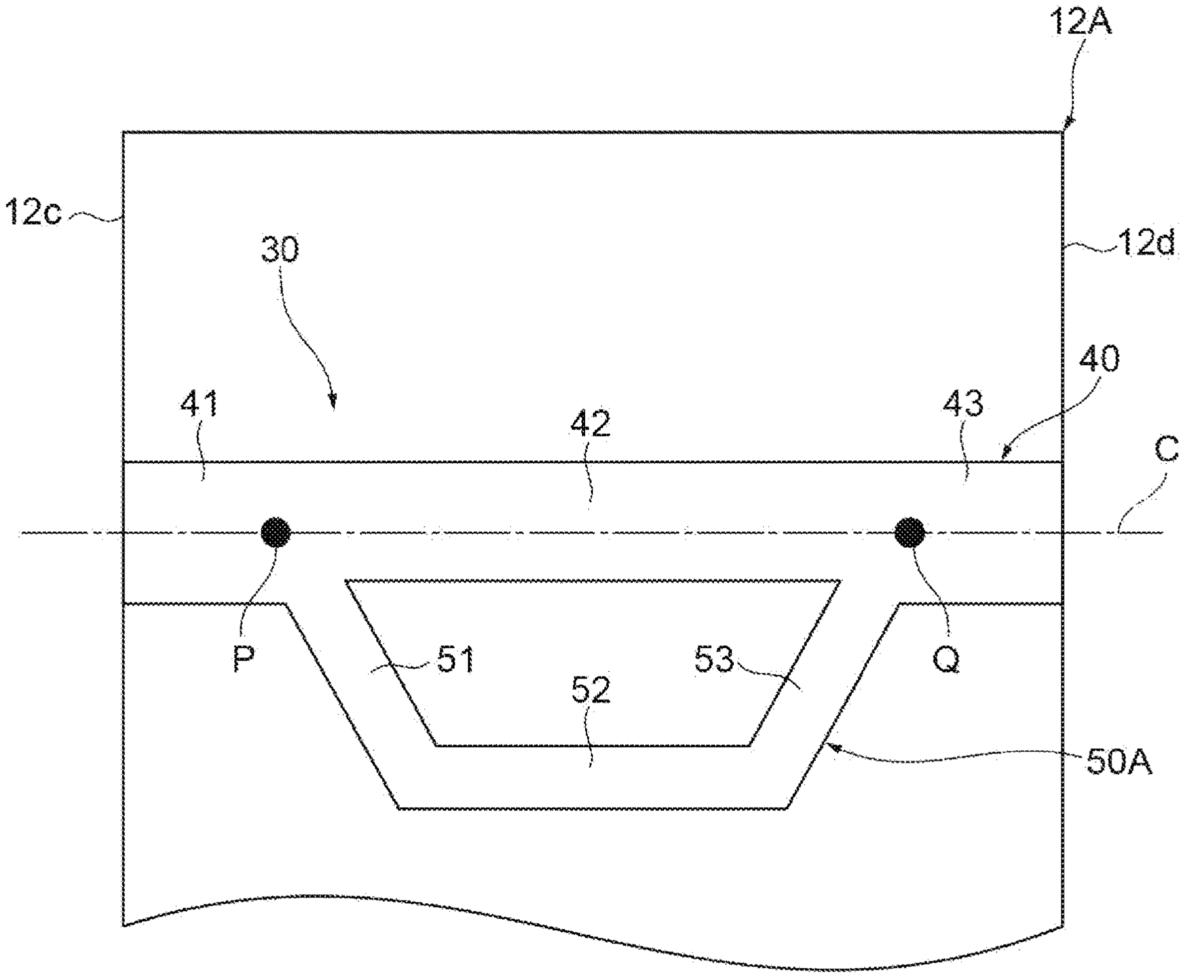
FIG. 5 is a view showing an inner conductor having different shape.

The inner conductor 30 is not limited to the above-described pattern, and various patterns may be adopted. The number of bypass patterns may be one, or a pattern including one of the pair of bypass patterns 50A and 50B may be provided. As in the embodiment shown in FIG. 5, the bypass pattern 50A located on the lower surface 10*b* side and the mainline pattern 40 are provided. In this case, a lower inductance value than the form including the bypass pattern 50A located on the upper surface 10*a* side and the mainline pattern 40 is realized.

The number of bypass patterns may be three or more. The bypass patterns 50A and 50B are not limited to the above-described shape defining a trapezoid with the second portion 42 of the mainline pattern 40, but may be a shape defining a semicircle with the second portion 42 of the mainline pattern 40 (that is, a semicircular ring shape) or a shape defining a polygon (triangle, rectangle, or the like) with the second portion 42 of the mainline pattern 40.

Figure 6:
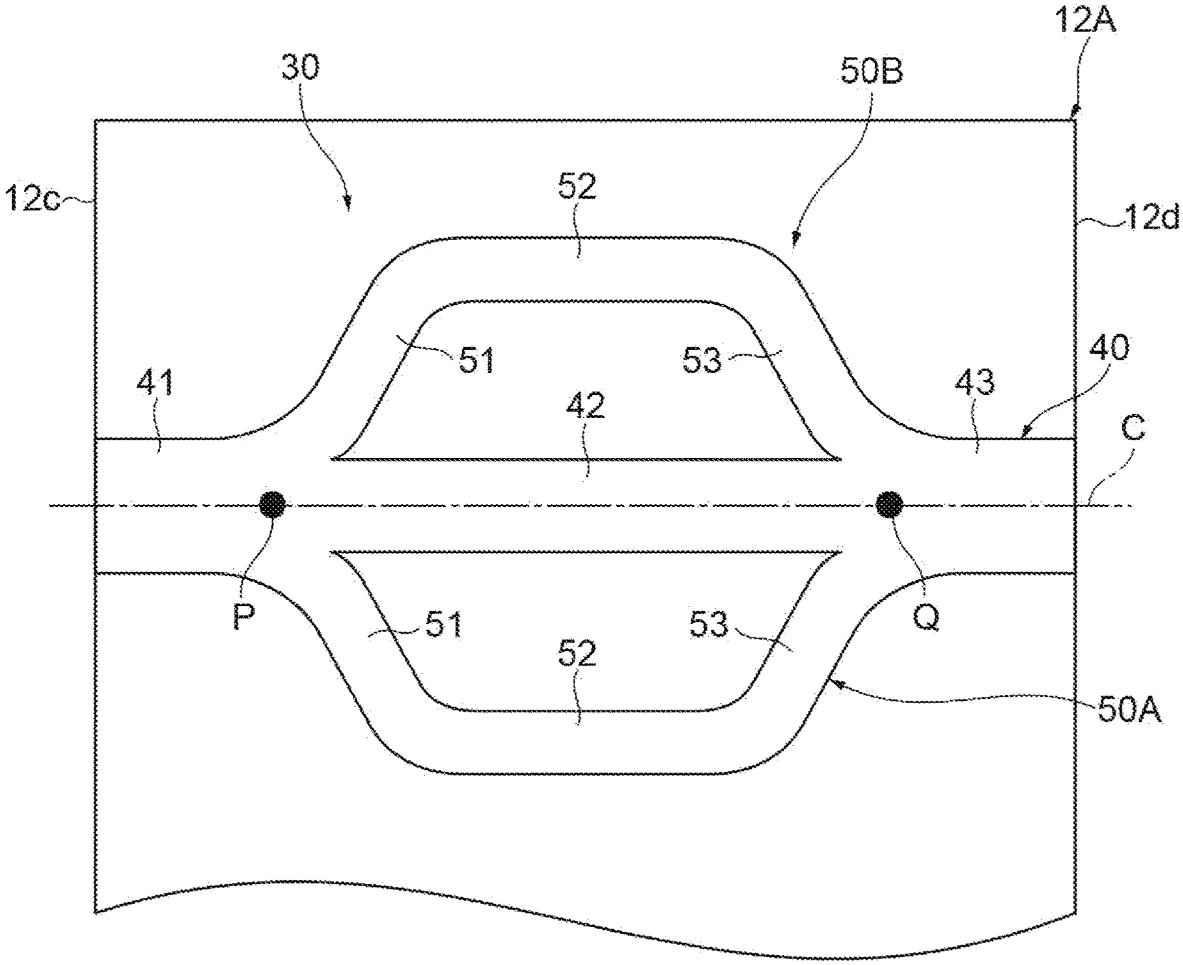
FIG. 6 is a view showing an inner conductor having different shape.

As shown in FIG. 6, the inner conductor 30 may have a form in which a corner portion is omitted. In the bypass patterns 50A and 50B shown in FIG. 6, the first portions 51 are branched from the mainline pattern 40 while maintaining smooth continuity, and the third portions 53 are merged with the mainline pattern 40 while maintaining smooth continuity. The joint between the first portion 51 and the second portion 52 and the joint between the second portion 52 and the third portion 53 are curved and smoothly continuous with each other. That is, the bypass patterns 50A and 50B are constituted by smoothly continuous curved portions and straight portions, and do not have a corner portion. In this case, the Q value, which is one of the characteristics of the multilayer inductor 1, is improved.

The inner conductor 30 may be provided not on one insulating layer 12A of the plurality of insulating layers 12 constituting the element body 10 but on a plurality of insulating layers 12A. In this case, the inner conductors 30 provided on the plurality of insulating layers 12A may have exactly the same shape and dimensions and may completely overlap each other when viewed from the X direction. In addition, the inner conductors 30 provided on different insulating layers 12A may have different shapes from each other.

What is claimed is:

1. A multilayer inductor comprising:

an element body having a multilayer structure in which a plurality of insulating layers are laminated, and having a mounting surface and a pair of side surfaces facing each other in a first direction parallel to the mounting surface;

a mainline pattern made of conductive material, extending linearly in the first direction between the pair of side surfaces of the element body, both end portions of the mainline pattern are exposed from the pair of side surfaces;

a bypass pattern made of conductive material, branched from and merged with the mainline pattern at positions away from the pair of side surfaces of the element body; and a pair of terminal electrodes respectively provided on the pair of side surfaces of the element body and electrically connected to the mainline pattern.

2. The multilayer inductor according to claim 1, wherein the plurality of insulating layers are laminated in a second direction orthogonal to the first direction and parallel to the mounting surface.

3. The multilayer inductor according to claim 1, wherein a height position of the mainline pattern is higher than an intermediate height position of the element body in height position relative to the mounting surface.

4. The multilayer inductor according to claim 1, wherein the bypass pattern is located on the mounting surface side of the mainline pattern.

5. The multilayer inductor according to claim 1, wherein the bypass pattern includes a smoothly continuous curved portion and a straight portion, and has no corner portion.

6. The multilayer inductor according to claim 1, wherein a width of the mainline pattern on both outsides of the positions where the bypass pattern is branched from and merged with the mainline pattern is wider than a width of the mainline pattern between the positions where the bypass pattern is branched from and merged with the mainline pattern.

7. The multilayer inductor according to claim 1, wherein a width of the mainline pattern on both outsides of the positions where the bypass pattern is branched from and merged with the mainline pattern is wider than a width of the bypass pattern.

8. The multilayer inductor according to claim 1, including a plurality of the bypass patterns.

9. The multilayer inductor according to claim 8, wherein the plurality of bypass patterns are symmetric with respect to the mainline pattern.

* * * * *